April 13, 1965

J. K. MOSHER ETAL 3,177,896

QUICK DISCONNECT FULL-FLOW COUPLINGS AND
UNITARY SOCKET THEREFOR

Filed March 29, 1963

James K. Mosher,
Nicholas Baskevitch,
INVENTORS.
WHANN & McMANIGAL
Attorneys for Applicants
by Robert M. McManigal

Fig. 9.

James K. Mosher,
Nicholas Baskevitch,
INVENTORS.
WHANN & McMANIGAL
Attorneys for Applicants United States Patent Office 3,177,896
Patented Apr. 13, 1965

3,177,896
QUICK DISCONNECT FULL-FLOW COUPLINGS
AND UNITARY SOCKET THEREFOR
James K. Mosher, Pasadena, and Nicholas Baskevitch, Hollywood, Calif., assignors to Schulz Tool and Manufacturing Co., San Gabriel, Calif., a corporation of California
Filed Mar. 29, 1963, Ser. No. 270,492
8 Claims. (Cl. 137—594)

This invention relates to quick disconnect couplings and more particularly, to a self-closing unitary socket structure having removably securable nipples therein, said nipples being automatically closable, and being openable by male connectors so as to have an unobstructed or full-flow passage.

The present application is a continuation-in-part of our prior co-pending application, Serial No. 66,192, filed on October 31, 1960, now abandoned and entitled "Quick Disconnect Full-Flow Couplings and Unitary Socket Therefor."

According to the invention a unitary dual socket arrangement has been provided to receive a pair of nipples in juxtaposition. Each of the nipples may be connected, for example, to an aircraft fuel drop tank, one of the nipples to provide an unobstructed passage for compressed air from the aircraft to the drop tank and the other to provide an unobstructed passage for fuel to the aircraft from the tank. After the tanks are emptied of fuel they are usually dropped from the wing of the aircraft, to which they are removably attached, and when this occurs, both of the nipples of the present invention automatically close.

It is an object of the present invention to provide the combination of an improved quick disconnect coupling including a unitary socket in which individual nipples are insertable in individual receptacles in the socket.

It is another object of the invention to provide improved unobstructed-flow, automatically closing nipples that are openable by the insertion of a male connecting member.

It is still another object of the invention to provide a unitary socket in an aircraft for receiving respective air and fuel nipples, connectible to a drop tank, the nipples being automatically opened when connected to a drop tank and being automatically closed when disconnected.

It is an object of the invention to provide a unitary socket of the character described in the immediately preceding paragraph in which the fuel nipple has an automatically closing valve adjacent its outer end to minimize fuel spillage to prevent a fire hazard when a drop tank is released.

It is another object of the invention to provide a unitary socket of the character described in the preceding paragraph and which, when the nipples are removed, is flush with the wing skin and hence does not cause any air resistance.

It is a further object of the invention to provide a unitary socket of the character described in the immediately preceding paragraph in which said nipples are prevented from rotation but may assume self-adjustable, variable longitudinal positions and in which one of the nipples is variable axially.

It is a still further object of the invention to provide a unitary socket of the character described in the immediately preceding paragraphs in which the nipples inserted therein have a closure for their external ends, when not connected, to, for example, a drop tank, said closure being securable on said nipples by displacing one of them longitudinally without rotation.

Yet another object of the invention is to provide a unitary socket in an aircraft for receiving respective air and fuel nipples connectible to a drop tank including a valve in the fuel nipple which is automatically closed when the drop tank is disconnected, the valve being capable of withstanding a pressure differential whereby the pressure within the fuel nipple is lower than the ambient air pressure.

Yet a further object of the invention is to provide a unitary socket of the character described in which both the air and the fuel nipples may be independently rotated or moved with respect to each other within certain limits to accommodate movements of the drop tank with respect to the airplane due, for example, to acceleration forces acting thereon.

Still a further object of the present invention is to provide a unitary socket of the character described wherein the air and fuel nipples may be rotated or moved with respect to each other to accommodate small variations of the distance between the male air and fuel fittings of the drop tank.

Further objects and advantages of the invention may be brought out in the following part of the specification wherein small details have been described for the competence of disclosure without intending to limit the scope of the invention which is set forth in the appended claims.

Referring to the accompanying drawings which are for illustrative purposes only.

Figures 1, 2, 3, 4, 5:
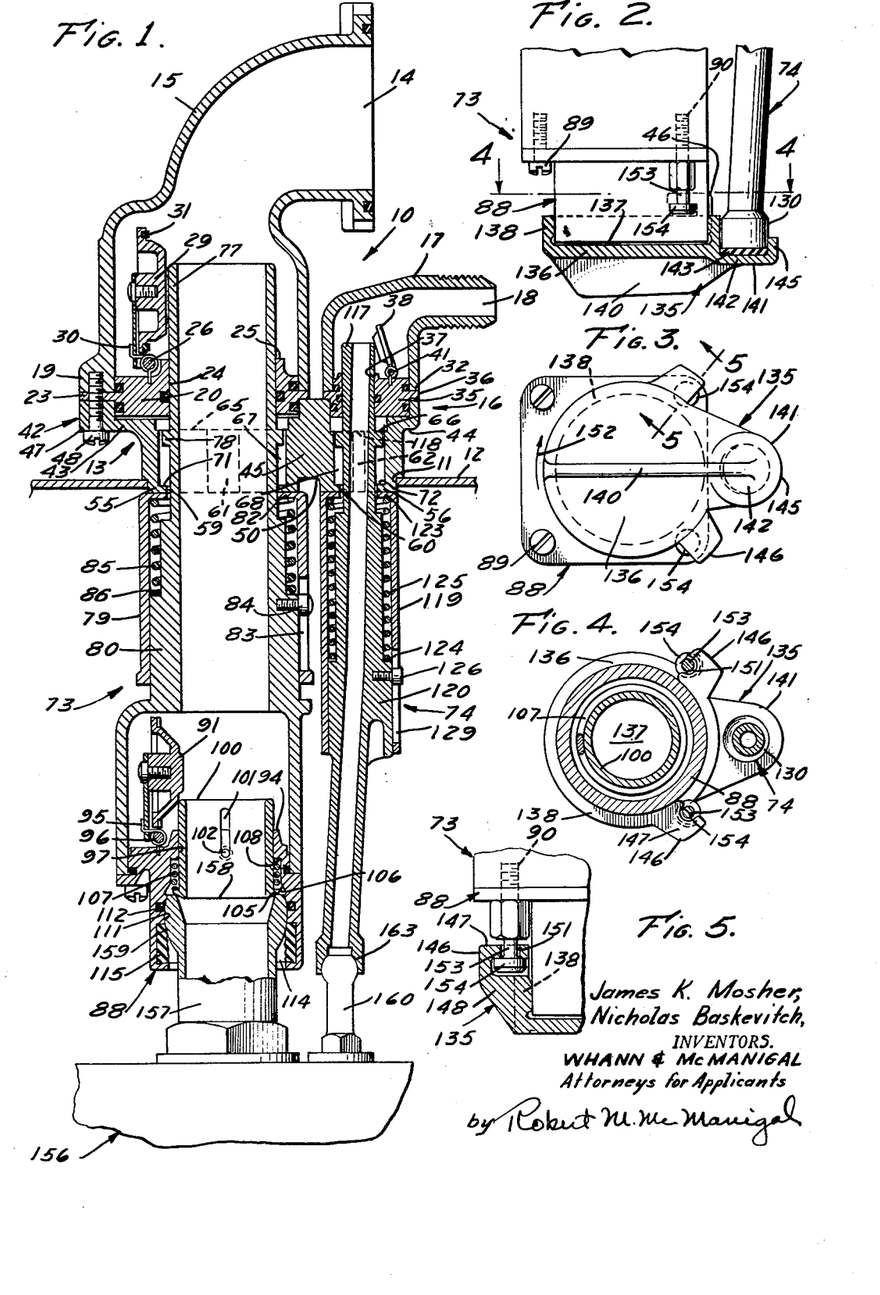
FIG. 1 is a side elevational cross-sectional view illustrating a unitary structure having a pair of sockets, each of said sockets having one end of a nipple removably secured therein, said nipples having their other ends in telescopic engagement with male fittings.
FIG. 2 is a fragmentary side elevational view of the outer ends of the nipples illustrating a nipple cover for use when they are not in engagement as shown in FIG. 1.
FIG. 3 is an end view of the nipple cover shown in FIG. 2.
FIG. 4 is a view taken as indicated by the line 4—4 in FIG. 2.
FIG. 5 is a fragmentary partially cross-sectional view taken as indicated by the line 5—5 in FIG. 3.
Figures 6, 7, 8:
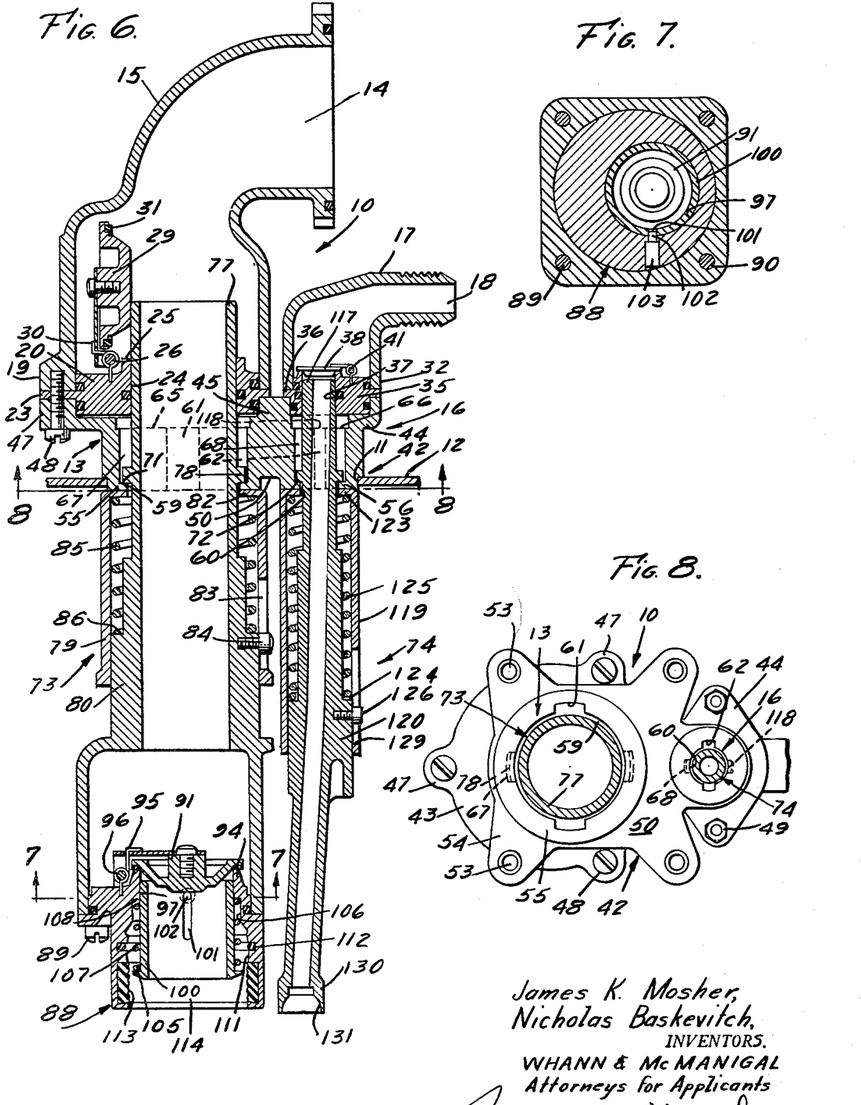
FIG. 6 is a cross-sectional elevational view similar to that of FIG. 1 but with the outer ends of the nipples disengaged from the male fittings.
FIG. 7 is a cross-sectional view taken along the line 7—7 in FIG. 6.
FIG. 8 is an end view of the unitary structure containing the two sockets, showing the nipples in cross-section, and taken as indicated on the line 8—8 of FIG. 6.

Referring again to the drawings, as shown in FIGS. 1, 6 and 8, there is shown a dual socket arrangement in the form of a unitary structure, generally designated as 10, mounted for purposes of illustration in an opening 11 in a lower wall of an aircraft wing 12 for providing connections to a drop fuel tank.

The assembly 10 in the use shown is comprised of a fuel socket 13 having an L 15 with a passage 14 through which fuel may be delivered from a drop wing tank to a tank within the aircraft and of a compressed air socket 16 having an L 17 with a passage 18 through which compressed air may be supplied to a drop wing tank to force the fuel out of the tank.

Sealingly engaged with open end 19 of L 15 is a generally disc-shaped valve plate 20. Extending radially outward from the valve plate is a flange 23 which is shaped in plan view to be complementary to the surfaces on end 19 of the L 15. Plate 20 has an off-center, circular bore 24 and at the inner end thereof is a valve seat 25. Hingedly secured to plate 23 by means of hinge pin 26 is an inwardly opening valve 29, biased towards its closed position by spring 30. Circular gasket 31, fitted in a groove in the inner face of the valve, is adapted to form a seal on seat 25 when the valve is in its closed position. Valve 29, when in its open position, as shown, is moved out of the flow path through bore 24 and is positioned in an enlarged portion of L 15 adjacent end 19.

Spaced from and adjacent to the end 19 of the L 15 is an enlarged diameter end 32 of the L 17, the said end surfaces of each being shown in substantially horizontal alignment in the drawings. The end 32 of L 17 has an enlarged diameter and sealingly fitted therein is a valve plate 35, similar to plate 20, having a peripheral flange 36 in abutment with the surfaces of end 32. Extending in an off-center position through plate 35 is a bore 37, and hingedly secured to the inner surface of plate 35 is a valve 38, biased by a spring 41 to be in the closed position, as shown in FIG. 6, to seal the bore 37. In its open position, valve 38 extends upwardly into the L 17, as shown in FIG. 1, out of alignment with bore 37.

A single cast joining member 42 is fitted to abut both of the plates 20 and 35 on their outer surfaces to secure the two L's 15 and 17 together to form the unitary socket assembly 10. As may be best seen in FIG. 8, joining member 42 has a flange portion 43 having substantially the same plan view as end 19 of the L 15 and has a second flange portion 44 integral with portion 43, the two being joined by a central block portion 45. Flange 43 has ears 47 through which screws 48 extend, the latter being threadedly engaged in the ears 47, the flange portion 23, and the end portion 19 so as to secure the three members in a sealed relationship. Similarly, screws 49, shown in FIG. 8, secure the L 17, plate 35, and the flange portion 44 of joining member 42 in a sealed relationship.

As best seen in FIG. 8, extending outwardly of the flange portions 43 and 44 is a mounting surface 50 which abuts the inner surface of wing 12 in FIGS. 1 and 6 and to which it is secured by fastening means, not shown, extending through bores 53 in ears 54 and through the mounting plate. Bosses 55 and 56 extending from surface 50 are fitted in opening 11 in wing 12, and, as shown in FIGS. 1 and 6, extend a short distance beyond the latter. Extending through joining member 42 and having its center substantially coincident with that of boss 55 is a generally cylindrical bore 59 in alignment with the slightly smaller bore 24 in valve plate 20. Similarly, bore 60, substantially concentric with boss 56, extends through member 42 and is in alignment with the slightly smaller bore 37 in plate 35.

Bores 59 and 60 have pairs of bayonet receiving slots 61 and 62, respectively, spaced at 180° from each other. They extend inwardly from the outer surfaces of the bosses to enlarged diameter portions 65 and 66, respectively, adjacent the inner ends of bores 59 and 60. In the respective bores 59 and 60, at 90° to the slots 61 and 62 extending outwardly of the enlarged diameter portions 65 and 66, are bayonet locking slots 67 and 68, terminating inwardly of the bosses at lips 71 and 72.

In the embodiment of the invention, shown in FIGS. 1, 6 and 8, a full-flow fuel nipple, generally designated 73, is shown to be engaged in fuel socket 13, and a full-flow compressed air nipple 74 is engaged in air socket 16. The fuel nipple 73 has its inner end and small diameter portion 77 sealingly engaged in bore 24 of valve plate 20, holding valve 29 in its open position.

Longitudinally outwardly of the valve plate 20, diametrically positioned and extending outwardly from the cylindrical surface of small diameter portion 77 of the nipple 73 are a pair of bayonets 78, and spaced longitudinally from the latter is a sleeve 79 slidably engaged on an enlarged diameter portion 80 of the nipple 73. At the inner end of the sleeve is an annular inwardly directed lip 82, radially spaced from the outer surface of the small diameter portion 77. An axially directed slot 83 extends through the wall of sleeve 79 intermediate its ends, the slot being slidably engaged on the head of screw 84 to limit the movement of the sleeve on the nipple. Spaced between sleeve 79 and the exterior of the nipple is a coil spring 85, having one end thereof in abutment with shoulder 86 at the end of enlarged diameter portion 80, and having its other end in abutment with lip 82 so as to bias the sleeve 79 toward the bayonet 78.

Referring now to FIGS. 6 and 8, to insert the end 77 of nipple 73 into the joining member 42 and the valve plate 20 of the fuel socket, the bayonets 78 must be aligned with the respective slots 61 and then the nipple is moved inwardly into the bore 24 to cause the hinged valve 29 to open, during which time the lip 82 comes into contact with lip 71 on the boss 55. When the bayonets 78 have been moved as far inwardly as the enlarged diameter portion 65, and thus out of the slots 61, the nipple is rotated 90° to align the bayonets with the locking slots 67. When they are so aligned, the lips 71 and 82 being in contact, spring 85 biases the nipple outwardly, moving the outer ends of the bayonets into locked contact with the inner surface of lip 71, as shown in FIG. 6.

As shown in FIGS. 2, 3, 6, and 7, at the outer end of nipple 73 is a self-closing female fitting 88 secured to be integral with the nipple by means of screws 89 and 90. At the inner end of fitting 88 is a hinged valve 91, similar to valve 29, and biased to be in a seaingly closed position on seat 94 by means of spring 95 which extends around the hinge pin 96. Inwardly of seat 94 is an axial bore 97 in which sleeve 100 is slidably engaged. Extending through the wall of the sleeve 100, intermediate its ends, is an axially directed slot 101 and into which extends a small diameter pin 102 held in position by a larger portion 103 secured in the wall of fitting 88, as best seen in FIG. 7.

At the outer end of sleeve 100 is a radially outwardly extending lip 105. Surrounding the sleeve 100 in the space provided by an enlarged diameter bore 106 in fitting 88, longitudinally outwardly of bore 97, is a coil spring 107 having its outer end in abutment with the surface of lip 105 and having its inner end in abutment with a shoulder 108 at the end of bore 97 so as to bias sleeve 100 longitudinally outwardly so that slot 101 has its inner end held toward pin 102. As best seen in FIG. 6, radially outwardly of a portion of sleeve 100 is a spherical surface 111 and cut therein is a groove containing O-ring 112. Longitudinally outwardly of surface 111 is an inwardly serrated rubber sleeve 113 bonded to the wall of the fitting 88 radially outwardly of the open end 114.

The air nipple 74 is similar to fuel nipple 73 and has its inner end small diameter portion 117 sealingly engaged in bore 37 of valve plate 35. Axially outwardly of end 117, relative to L 17, extending diametrically outwardly from the surface of the small diameter portion of the nipple 74, is a pair of bayonets 118, and longitudinally spaced from the bayonets is a sleeve 119 slidably engaged with an enlarged diameter portion 120 of the nipple. At its inner end sleeve 119 has a radially inwardly directed lip 123 of larger internal diameter than the inner end portion 117 of the nipple. Extending between shoulder 124 on the inner end of enlarged diameter portion 120 and the inner plane surface of lip 123 is a coil spring 125 spaced annularly between the nipple body and the sleeve 119. The spring 125 biases sleeve 119 toward the bayonets 118, the sleeve being limited in its longitudinal displacement by means of a screw 126 slidably engaged in slot 129 in the wall of the sleeve, said screw being threadedly engaged in portion 120.

Nipple 74 is inserted into air socket 16 in the same manner as nipple 73 is inserted into the fuel socket. That is, the end 117 of nipple 74, with bayonets 118 in alignment with the slots 62, is moved inwardly through bore 60 in boss 56 until the bayonets 118 are beyond the ends of the slots 62, and into enlarged diameter portion 66 in which the nipple and bayonets are rotated 90° so that the spring 125 will force the latter into locking slots 68 and into contact with lip 72. At this time, as shown in FIG. 6, lip 123 is in contact with the said boss, the spring holding the nipple in locked relationship in the socket.

It will be evident from the above description that both the fuel nipple 73 and the air nipple 74 are prevented from rotating in the positions shown in FIGS. 1 and 6. On the other hand, both the fuel nipple 73 and the air nipple 74 can be moved longitudinally or axially against the force of the respective springs 85 and 125 between the limits of movement illustrated in FIGS. 1 and 6.

It is to be noted that, in contrast to valve 29 being in its open position when the fuel nipple is in its socket, the air valve 38 is closed when the air nipple is in its socket and fully biased by the spring 125 away from the socket. Thus, the socket is sealed and the nipple 74 is opened throughout its entire length.

The outer end 130 of nipple 74 has a substantially spherical seat 131 adapted to receive a male fitting in sealing engagement, the outer end being shown to be eccentric to the axis of the nipple portion fitted in the socket, extending toward the fuel nipple 73. This arrangement is to accommodate predetermined spaced male fittings which are adapted to engage the two nipples, that is, end 130 may be placed in an alternate position by rotating the nipple 180° from the position shown, before it is inserted, and then locked in place to have end 130 extending away from nipple 73. It should also be noted that nipple 74, in the position shown in FIG. 6, extends longitudinally beyond nipple 73.

The two nipples 73 and 74 may be carried, for example, as shown in FIG. 6, extending from the wing of an aircraft without a drop tank attached thereto. In this situation the valve 91 remains closed as does the valve 38 to seal the fuel passage 14 and the air passage 18, respectively, to the aircraft fuel system. However, in this arrangement the fitting 88 is open through its end 114 to the valve 91 and the nipple 74 is open for its entire length. To prevent the entry of dust and other foreign material into the open ends of both nipples, a single cover, designated generally as 135, is provided, as shown in FIGS. 2, 3, 4, and 5, comprised of two integrally joined caps, one being cap 136 adapted to fit over the end of fitting 88 of the fuel nipple and having a base wall 137 adapted to close the open end 114. Extending inwardly, as shown in FIG. 2, from the wall 137 is a continuous cylindrical wall 138 so as to surround the outer end portion of fitting 88.

Extending diametrically and vertically outwardly from the top of cap 136 is a handle 140 which joins cap 141 adapted to cover the open end of the air nipple. The cap 141 has an end wall 142 and to the inner surface thereof is bonded a rubber sealing disc 143 adapted to fit over end 130 of the air nipple. The cap 141 has a generally semicircular side wall 145 which permits the latter cap to be rotated so that the inner surface of the disc can be moved onto the end of the air nipple when cap 136 is rotated on its axis on the fuel nipple. The outer end 130 of air nipple 74 may be pulled inwardly against the force of spring 125 to permit the sealing disc 143 of cap 141 to engage the outer end 130 of the air nipple. Circumferentially spaced on wall 138 and extending axially away from the inner surface of wall 137 are locking ears 146 each having a lip 147 inwardly directed and spaced from the body portion 148 of the ears. The lips 147 have substantially semicircular cutaway portions 151, having their centers parallel to the axis of the cap 136 and having their semicircular surfaces facing clockwise in FIG. 3 for rotation by means of cap handle 140 in the direction indicated by the arrow 152.

For locking the cover 135 on the fitting 88, screws 90 are provided with an extension having a small diameter pin portion 153 with an enlarged diameter head 154 extending therefrom, the respective locking ears 146 being adapted to be rotated so that the cutaway portions 151 engage pins 153 and the heads 154 fit into the space between lips 147 and bodies 148. To tightly secure the cover 135 on fitting 88, and on end 130, and the locking ears on the pins 153, the cap 136 is rotated on fitting 88 in the clockwise direction, as indicated in FIG. 3. During this rotation, since the end 130 of air nipple 74 extends outwardly beyond the end of fitting 88 on fuel nipple 73, the nipple 74 is moved inwardly into the socket against the force of its spring 125 to allow the cap 141 to be rotated into alignment therewith. After it is in the said alignment and the ears are in engagement with the pins 153, the nipple 74 is released and its spring forces its end 130 into sealing engagement with disc 143 and locks the cover 135 in place on the ends of the nipples, the heads 154 being held tightly against the lips 147.

In FIG. 1, as stated, a typical use of the invention is illustrated, and the nipples are shown to be engaged with a drop fuel tank, designated generally as 156. Extending upwardly from the tank 156 is a male fuel discharge fitting 157, having an open end 158 and an outer, sealably engaging spherical-shaped surface 159. In juxtaposition to the fuel discharging fitting 157 is a compressed air inlet male fitting 160, also having a spherical sealably engaging surface 163. Drop tanks are typically secured to aircraft wings by means, not shown, which are comprised of explosive bolts, and when it is desired to release them, the explosive is ignited in the bolt and the tanks automatically become disengaged from the aircraft wing and fall away.

Thus, when the tank 156 is being secured to the wing, the open end of the male fitting 157 is inserted into the open end 114 of fitting 88 and as it passes into contact with the serrations on the bonded rubber sleeve, the sealing surface 159 is frictionally cleaned. As may be visualized in viewing FIG. 6, as the fitting 157 is moved inwardly into open end 114, its end 158 comes into contact with lip 105 on sleeve 100 and as the fitting 157 is continually moved inwardly, the sleeve is moved upwardly, against its spring 107, on pin 102 in bore 97, to lift hinge valve 91 off its seat and, as shown in FIG. 1, to move it into a vertical position. At this point, the sleeve 100 is limited against further movement by the pin 102 in contact with the bottom end of the slot 101 and the spherical surface 159 on the fitting 157 is in sealing engagement with the complementary spherical surface 111 in the female fitting, the seals being formed both by the sleeve 113 and the O-ring 112.

According to the design of the explosive support fittings, not shown, the tank 156 is held at a distance from the wing 12 so that when fitting 157 is fully inserted into the fitting 88, the entire nipple 73 will have been moved inwardly of the position shown in FIG. 6 to that shown in FIG. 1. In other words, the central portion 80 of the nipple, inwardly of sleeve 79, is moved inwardly relative to the latter against the force of the spring 85 and the bayonets 78 are moved into an upper locking position in the bayonet locking slots 67, the locking slots in combination with the spring serving to lock the bayonets in any self-adjusting, longitudinal position between the enlarged diameter portion 65 at their top and the lips 71 at their bottom.

By moving the nipple 73 inwardly against the force of its spring 85 in making the connection with drop tank, the spring 85 further serves to force the fitting 88 of the nipple into a tight sealing relationship with the male member 157. It should also be noted that in the relationship shown in FIG. 1, the nipple 73 and the fuel socket 13 are fully open and the flow passage therethrough is in axial alignment with the flow passage of the fitting 157.

As the drop tank is being secured to the wing and as the fitting 157 is being inserted into the female fitting 88, the air fitting 160 is simultaneously inserted into the end 130 of the air nipple 74 so that the surface 163 moves into a sealing engagement with the surface 131 of the air nipple. As the fuel nipple 73 is moved toward the tank while the engagement is being made, the air nipple 74 is also moved, against the force of its spring 125, farther inwardly into socket 16, as may be seen by comparing FIGS. 1 and 6. As this movement occurs, bayonets 118 are moved upwardly into an upper locking position in locking slots 68 and the inner end 117 of the nipple 74 moves into contact with the hinged air valve 38 so as to fully open it as shown in FIG. 1. Here again, the air passage is fully open from the air inlet 18 to the tank.

When it is desired that the fuel in the tank 156 be delivered to the aircraft fuel system, compressed air is caused to enter the air socket 16 so as to force the fuel out of the tank and into the fuel system through fitting 157, the nipple 73, and the fuel socket 13. As the name implies, when a drop tank is emptied, it is generally caused to be released by exploding its supporting bolts, at which time its weight pulls it from its engagement with the outer ends of the nipples. When the latter occurs, the valve 91 and the valve 38 are closed by their respective springs and the springs of the two nipples move them into the position shown in FIG. 6 with the bayonets against the lips 71 and 72, respectively, of the locking slots.

When the plane again comes to the surface, if it is desired that the nipples remain in the sockets, the cover 135 is placed on their respective ends to prevent the entrance of foreign matter. Further, if it is decided that the nipples should be removed from the wing, each is individually pushed inward against its respective spring so that the locking bayonets are moved out of the locking slots and then rotated 90° into the slots 61 or 62, as the case may be. When they are moved into the latter slots, the springs, plus gravity, force the nipples out of the sockets. As previously indicated, the air valve 38 is closed to seal the socket when the drop tank is released, there being no valve in the air nipple. However, the fuel nipple 73 is provided with the valve 91 to substantially eliminate fuel spillage out of the open end 114 to prevent a fire hazard. That is, when the tank is dropped, the valve automatically closes. This makes it unnecessary to close the valve 29 while the nipple is in the fuel socket.

Figure 9:
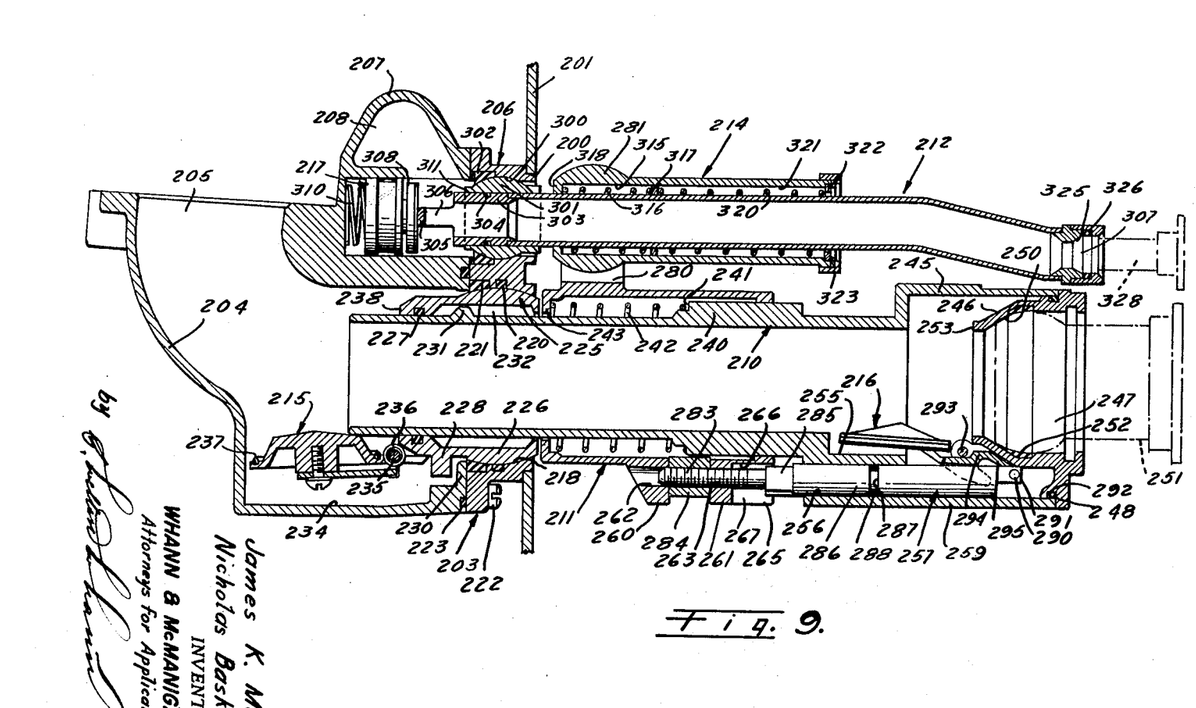
FIG. 9 is a longitudinal sectional view illustrating a modified quick disconnect unitary coupling structure having a pair of sockets, each having one end of a nipple removably secured therein, said nipples having their outer ends in telescopic engagement with male fittings shown in phantom lines.
Figure 10:
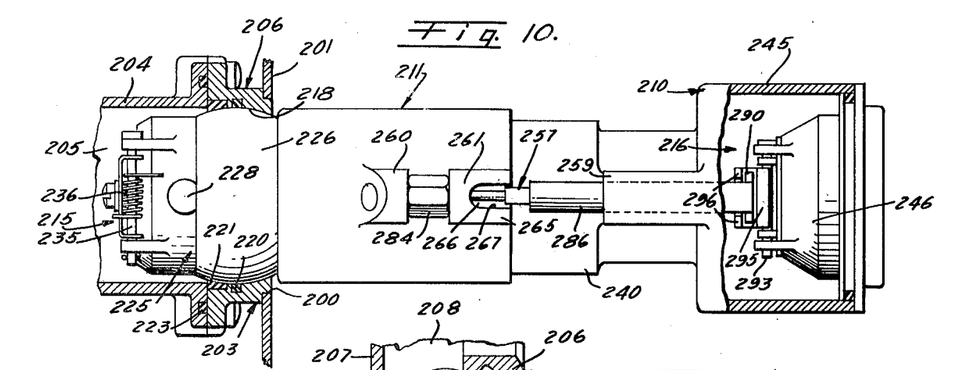
FIG. 10 is a side elevational view, parts being broken away, of the modified coupling structure of FIG. 9 with the outer ends of the nipples disengaged from the male fittings and showing the fuel valves in a closed position.
Figure 11:
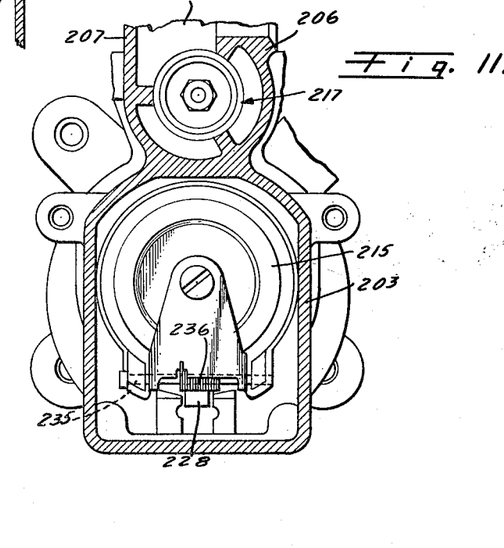
FIG. 11 is a cross sectional view through the closed inner fuel valve and the closed inner air valve.

Referring now to FIGS. 9 through 11, there is illustrated a modified unitary socket structure and coupling in accordance with the present invention. The unitary socket structure of FIGS. 9 through 11 again includes a fuel nipple and an air nipple having valves which automatically close upon disconnecting the nipples from the male fittings. In addition, both the air and fuel nipples are arranged so that they can be relatively rotated or moved with respect to each other within certain limits.

The purpose of this arrangement is to allow for relative movement of a fuel drop tank and an airplane, the tank being connected through the couplings to the airplane. For example, when the airplane is subjected to high acceleration forces of the type which occur when the plane is launched from an aircraft carrier by a catapult, the fuel drop tank will move relative to the airplane wing. The improved coupling of FIGS. 9 through 11 will permit such movements of the fuel drop tank with respect to the airplane without damaging the coupling. This structure also makes it possible to align the air and fuel nipples with respect to the male fittings on the fuel drop tank, if the relative distance between the two fittings should vary.

In addition, the unitary socket structure and coupling of FIGS. 9 through 11 is provided with an outer fuel valve which automatically closes when the male fitting is disconnected. This outer fuel valve is arranged to withstand a certain pressure differential between the pressure within the fuel line and the ambient pressure. In other words, due to different flight conditions, the ambient air pressure may become higher than the pressure within the fuel line. The valve is so arranged that it will remain closed as long as the pressure differential does not exceed a certain value which may, for example, be 2.5 pounds per square inch.

Referring now particularly to FIGS. 9 to 11, there is shown a dual socket arrangement of unitary structure which again has been shown by way of example as mounted in an opening 200 in a lower wall of an aircraft wing 201 for providing connections to a fuel drop tank, not illustrated. The entire coupling assembly may again include a fuel socket 203 having an L-shape fuel conduit 204 with a passage 205 through which fuel may be delivered from a drop wing tank to a fuel tank within the aircraft. The assembly further includes an air socket 206 having an air conduit 207 providing an air passage 208 through which compressed air may be supplied from the airplane to the drop wing tank to force fuel out of the drop wing tank.

Slidably disposed in the fuel socket 203 is a fuel nipple 210 having an outer fuel sleeve 211. Similarly, the air socket 206 may have slidably connected thereto an air nipple 212 having an outer air sleeve 214. The fuel nipple 210 is provided with an inner flapper valve 215 and an outer flapper valve 216. The air nipple 212 is provided with an inner poppet valve 217 while the outer end of the air nipple 212 is open to the atmosphere.

The fuel socket 203 has a semi-spherical opening or seat 218 therein which may be sealed by an O-ring 220 and a fuel seal 221. The fuel conduit 204 may be connected to the fuel socket 203 by screws 222. An O-ring 223 disposed in the outer flange of the fuel conduit 204 seals the conduit to the fuel socket 203. A fuel socket sleeve 225 is disposed about the inner end of the fuel nipple 210 and is provided with a semi-spherical projection 226 which engages the seat 218 of the fuel socket 203 to provide a swivel connection for the fuel nipple 210.

An O-ring 227 may be provided on the inner end of the fuel socket sleeve 225 to seal it with respect to the fuel nipple 210.

Thus, the fuel socket sleeve 225 forms a swivel which permits the fuel nipple 210 to swivel with respect to the fuel socket 203. This swivel movement is limited by a cylindrical projection 228 on the sleeve 225 which is normally spaced from a lip 230 on the flange of the fuel conduit 204.

The fuel nipple 210 is provided with three circumferentially spaced bayonets 231 which as shown in FIG. 9 are disposed within the fuel socket sleeve 225. The socket sleeve or swivel 225 is provided with corresponding bayonet slots 232. Accordingly, once the fuel nipple 210 is in engagement with the fuel socket sleeve 225, the two members are unable to rotate with respect to each other. However, the fuel nipple 210 can slide axially or longitudinally with respect to the socket assembly 203 and 205. On the other hand, the fuel nipple 210 with its socket sleeve 225 are permitted to rotate axially or to swivel about the seat 218.

The fuel conduit 204 has a lateral recess 234 within which the flapper valve 215 is disposed when the valve is open. The flapper valve 215 has a hinge 235 on the socket sleeve 225 about which a coil spring 236 extends which tends to bias the flapper valve into its closed position. The flapper valve 215 is provided with a valve seal 237 which is adapted to engage the inner end 238 of the socket sleeve 225 when the valve is closed (see FIGS. 10 and 11) thus to seal the inward end of the fuel nipple 210.

The fuel nipple 210 has an outwardly enlarged intermediate portion 240 providing a shoulder 241 against which a coil spring 242 bears which encircles the fuel nipple. The other end of the coil spring 242 bears against a circumferentially extending lip 243 of the fuel sleeve 211. The spring 242 urges the fuel nipple 210 and the fuel sleeve 211 apart while the lip 243 of the sleeve engages the fuel socket 225. In the absence of pressure exerted on the outer end of the fuel nipple 210, the fuel nipple is moved outwardly by the spring 242.

The outer portion of the fuel nipple 210 is enlarged as shown at 245, and is provided with a generally conical valve seat 246 secured to the open outer end 247 of the fuel nipple 210. An O-ring seal 248 seals the conical valve seat 246 to the fuel nipple 210. The valve seat 246 has an inner semi-spherical seat 250 which is adapted to engage the semi-spherical outer end of the male fitting 251 of the fuel drop tank not illustrated. A fuel seal 252 may be provided in the spherical opening 250 of the valve seat 246 to seal the fuel npple to the male fitting 251. The valve seat 246 has an inwardly extending valve seat 253 engageable with the flapper valve 216.

The outer portion of the fuel nipple 210 is provided with an internal recess 255 in which the flapper valve 216 is disposed when the valve is open to provide for an unobstructed flow of the fuel.

The fuel nipple 210 at its outward end is further provided with a cylindrical extension 259 having a cylindrical bore 256 extending longitudinally therethrough. Disposed in the longitudinal bore 256 is a shaft 257, the construction and purpose of which will be explained hereinafter.

The fuel sleeve 211 disposed about the intermediate portion of the fuel nipple 210 is also provided with two spaced cylindrical projections 260 and 261. Each projection 260 and 261 has a cylindrical bore 262 and 263 in alignment with the cylindrical bore 256 of the cylindrical extension 259. Accordingly, the shaft 257 extends through the respective bores 256, 262 and 263.

The projection 261 has an outwardly extending portion 265 having a flat bottom portion 266 and two flat side walls 267 (see FIG. 10) adapted to engage correspondingly shaped flat portions of the shaft 257.

The fuel sleeve 211 is further provided at its inward portion with an outwardly projecting fork 280, one prong of which is shown in FIG. 9. The two prongs of the fork 280 are also formed with an inner semi-spherical seat for receiving a spherical projection 281 on the air sleeve 214. This swivel connection provided by the fork 280 and the spherical projection 281 serves to interconnect the air nipple 212 with the fuel nipple 210.

The shaft 257 is adjustable with respect to the fuel sleeve 211 and serves the purpose to open and close the outer fuel flapper valve 216 and to maintain the valve closed against a pressure differential whereby the pressure within the fuel line 210 may be lower than ambient air pressure. Shaft 257 has its inward end 283 threaded as shown. A nut 284 fits into the space between the two projections 260 and 261 and threadedly engages the shaft 257. Thus, by rotating the nut 284 the shaft may be pulled inward or pushed outward with respect to the fuel sleeve 211.

In order to prevent rotation of the shaft, the shaft 257 is provided with a portion 285 having three flat surfaces adapted to engage respectively the flat bottom wall 266 and the corresponding side walls 267 of the projection 261. As a result, as soon as the shaft portion 285 engages the respective flat walls 266 and 267 of the projection 261, the shaft is prevented from rotating but can be moved longitudinally by rotating the nut 284.

The rear portion 286 of the shaft 257 has an enlarged circular cross section and fits into the cylindrical bore 256 of the projection 260. This portion 286 of the shaft is provided with an annular recess 287 for receiving an O-seal 288 which seals the shaft 257 with respect to the fuel nipple 210.

The outermost portion of the shaft 257 is provided with two laterally extending pins 290 as shown particularly in FIG. 10. The outer end of the shaft 257 may be provided with a lower recess 291 so as to clear a projection 292 on the valve seat 246 which houses the O-ring 248.

As pointed out hereinbefore the purpose of the shaft 257 is to engage the flapper valve 216 to open or close the same. To this end, the flapper valve 216 is hinged by the hinge 293 to the valve seat 246.

The flapper valve plate 216 has secured thereto a cam arm 294 having a continuous curved extension 295 and two prongs 296 spaced from each other and from the projection 295. The two prongs and the extension 295 form a forked lever which is so arranged that it will engage the pins 290 on the shaft 257 upon relative movement between the shaft 257 and the cam arm 294 of the flapper plate 216.

Assuming, for example, that the male fuel fitting 251 is removed from the fuel nipple 210. This will permit the fuel nipple 210 to move outwardly under the force of the spring 242. The spring 242 bears against the lip 243 of the fuel sleeve 211 which in turn bears against the socket sleeve 225. As a result, the fuel nipple 211 is forced outwardly, until the bayonet 231 reaches the outer end of the fuel socket sleeve 225. This outward movement of the fuel nipple 210 permits the flapper valve 215 to close under the influence of its spring 236.

At the same time, the shaft 257 is locked with respect to the fuel sleeve 211 which remains stationary. Therefore, the outward movement of the fuel nipple 210 will cause engagement between the lower projection 295 and the two prongs 296 of the cam arm 294 of the outer flapper valve 216, and the pins 290 of the shaft. Consequently, the flapper plate 216 is rotated about its hinge 293 and eventually seats upon the valve seat 253 as illustrated in FIG. 10.

The force of the spring 242 and the leverage of the cam arm 294 engaging the pins 290 on the shaft 257 are such that the flapper valve 216 remains closed even against a pressure acting outwardly against the valve. Thus, the flapper valve 216 may be so designed as to withstand a pressure differential of 2.5 pounds per square inch, with the lower pressure existing within the fuel nipple 210. This arrangemnet insures that any fuel which may be contained in the fuel nipple 210, for example, after the drop tank has been removed will not spill from the coupling even though the ambient pressure is greater than the internal pressure.

It will be appreciated that the nut 284 may be used to adjust the relative position between the shaft 257 and the cam arm 294 of the outer flapper valve. This insures a tight seal of the outer flapper valve under all conditions.

Turning now to a description of the air nipple 212, it will soon become apparent that the air nipple does not have a bayonet lock with its socket 206. The air socket 206 is preferably made integral with the fuel socket 203. The air socket 206 is also provided with a semi-spherical seat 300 which engages with a semi-spherical projection 301 secured to the air nipple 212. An air seal 302 is provided in the air socket 206 to seal the semi-spherical projection 301. The innermost end of the air nipple 212 is secured to a cylindrical insert 303 having an O-ring seal 304 which seals the insert with respect to the semi-spherical projection 301. The insert 303 is provided with an inwardly projecting portion 305 of reduced diameter and provided with apertures 306 which permit the air to flow from the air passage 208 into the outermost end 307 of the air nipple 212.

Cooperating with the reduced extension 305 is a disc 308 forming a poppet valve which is biased against the extension 305 by a bias spring 310. Thus, with the air nipple 212 in the position shown in FIG. 9, the poppet valve 217 is open. However, assuming that the air nipple 212 is moved outwardly, the disc 308 will engage with the valve seat 311 which is formed on the inward end of the semi-spherical projection 301.

The air sleeve 214 has a semi-spherical projection 281 which is received by the two prongs of the fork 280. The air sleeve 214 surrounds the intermediate portion of the air nipple 212 and has a first internal recess 315 within which is disposed a coil spring 316. The coil spring 316 bears against the wall 317 provided on the air nipple 212 and against the inwardly extending lip 318 of the sleeve 214. Another coil spring 320 is disposed on an adjacent internal recess 321 of the air sleeve. This spring also bears against the wall 317 while its other end bears against a retainer 322 at the outward end of the air sleeve. The retainer 322 may be secured to the air sleeve 214 by an apertured cap 323.

The outer end of the air sleeve 312 may also be provided with a semi-spherical seat 325 having an air seal 326. A male air nipple 328 has an outer semi-spherical portion adapted to engage with the semi-spherical seat 325 as shown in FIG. 9.

It will now be appreciated that the air nipple 212 may be rotated about its swivel 300, 301 until the fuel nipple 210 interferes with the air nipple 212. As pointed out before, when the male air fitting 328 is removed, the air nipple 212 moves outwardly under the influence of the spring 316 which overpowers the spring 320. This is due to the fact that the spring 316 bears against the wall 317 of the air nipple 212 and hence forces the air nipple outwardly. This will cause the poppet valve 217 to close as previously described.

In order to assemble the coupling of FIGS. 9 through 11 the fuel nipple 210 is first inserted into the fuel socket sleeve 225, and is rotated into the position shown in FIG. 9. Then, the air sleeve 214 of the air nipple 212 is pulled outwardly against its spring to the stop or wall 317 and held there. Then, the spherical end portion 281 of the air sleeve 214 is inserted into the fork 280 on the fuel sleeve 211. Then the air sleeve 214 is released again to permit the semi-spherical projection 301 of the air nipple 212 to enter into the semi-spherical seat 300 in the air socket 206. This locks the coupling assembly in place.

FIG. 9 shows the coupling assembly with the male fuel fitting 251 and the mail air fitting 328 in place. FIG. 10 illustrates the coupling assembly with both the upper fuel flapper valve 215 and the lower fuel flapper valve 216 closed and with the male fittings 251 and 328 removed.

It will be noted that the structure of FIG. 11 resembles that of FIG. 8 and therefore no further description is believed to be necessary.

It may also be noted that a dust cover such as shown at 135 particularly in FIGS. 2 through 5, may again be used with the coupling assembly of FIGS. 9 through 11. Again, it will be noted that the air nipple 212 may be moved axially inwardly when the coupling is in the position of FIG. 10 with respect to the fuel nipple 210 to permit the dust cover to be rotated into place.

There has thus been disclosed a unitary dual coupling which is characterized by full fuel and air flow and which permits quick disconnection of the couplings and which has at least one valve in each of the fuel and air nipples which prevents rotation of the nipple but permits longitudinal movement thereof. In one of the embodiments, relative movement between the air and fuel nipples is permissible within certain limits to accommodate relative movement between the aircraft and the fuel drop tank. Additionally, the outer fuel valve may be so designed as to be able to withstand an external pressure greater than the internal pressure without opening. Due to the fact that the fuel and air nipples are adjustable in their longitudinal positions, they allow for variations of the corresponding male fittings and for relative movements of the parts which may be caused, for example, by the forces of acceleration.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific form shown or uses mentioned except as defined in the accompanying claims, wherein various portions have been separated for clarity of reading and not for emphasis.

We claim:
1. Mechanism for connecting fuel and air conduits of a drop tank to an aircraft comprising:
   (a) a fuel socket adapted to be secured at one end to an aircraft and adapted to discharge into the aircraft fuel system;
   (b) said fuel socket having one end of a fuel nipple slidably engaged in its other end;
   (c) an air socket secured to said fuel socket, adapted to be secured at one end to said aircraft and adapted to receive compressed air from an air supply in said aircraft,
   (d) said air socket having one end of an air nipple slidably engaged in its other end;
   (e) bayonet means extending outwardly of said respective nipples into corresponding elongated axially directed locking slots in said respective sockets, said nipples being rotatable when moved axially to a predetermined point relative to said locking slots so as to be removable from said sockets and being prevented from rotating when said bayonet means are in engagement with said locking slots;
   (f) an outer sleeve slidably engaged with and outwardly of each of said respecitve nipples and axially disposed inwardly of said bayonet means;
   (g) a coiled spring in an annular space between each of said respective nipples and said respective outer sleeves so as to bias said outer sleeves toward said bayonet means and toward and in abutment with an outer face of said respective sockets, said springs holding said respective nipples in axially variable positions in said sockets, said other ends of said respective nipples being adjacent to each other and extending approximately the same distance from said sockets, said other ends of said nipples when not attached to the drop tank having thereon a combination closure comprising,
   (h) a cap extending over one of said nipples and being rotatable thereon when said other nipple is moved inwardly against its coiled spring to one of said variable positions,
   (i) said cap having flange extensions extending from its closed end; and
   (j) said flange extensions being rotatable into engagement with holding means on said one nipple and when so rotated, being held tightly on said holding means by said other nipple in engagement with a portion of said flange extending thereover and closing the same.

2. A unitary dual coupling device comprising:
   (a) a first socket having one end of a first nipple slidably engaged in one of its ends;
   (b) a second socket having one end of a second nipple slidably engaged in one of its ends, said one ends of said sockets being juxtaposed;
   (c) locking means in said sockets in cooperation with locking means on said respective nipples removably securing said nipples axially in variable positions while preventing rotation thereof;
   (d) each of said respective sockets having a hinged socket valve being operable by said nipples and for closing its one end when said nipples are removed, at least one of said
   (e) socket valves being closable with its respective nipple in its socket when said last nipple is moved axially into a position adjacent said one end of the socket, said other ends of said respective nipples being adjacent to each other and extending approximately the same distance from said sockets, said other ends of said nipples having thereon a combination closure comprising, (f) a cap extending over one of said nipples and being rotatable thereon when said other nipple is moved inwardly against its locking means to one of said axially variable positions, (g) said cap having flange extensions extending from its closed end; and (h) said flange extensions being rotatable into engagement with holding means on said one nipple, said other nipple being spring-biased by its locking means toward said cap so that when said one nipple is rotated into engagement with said holding means, it is held tightly thereon by said other nipple, being in spring-biased engagement with a portion of said flange extending thereover and closing the same.

3. Mechanism for connecting fuel and air conduits of a drop tank to an aircraft comprising:

(a) a fuel socket adapted to be secured at one end to an aircraft and adapted to discharge into the aircraft fuel system;

(b) said fuel socket having one end of a fuel nipple slidably engaged in its other end;

(c) an air socket secured to said fuel socket, adapted to be secured at one end to said aircraft and adapted to receive compressed air from an air supply in said aircraft, (d) said air socket having one end of an air nipple slidably engaged in its other end;

(e) a swivel connection between each of said sockets and their nipples to permit rotation and tilting of said nipples with respect to their sockets;

(f) locking means in said swivel connection in cooperation with locking means on said fuel nipple removably securing said fuel nipple axially in variable positions while preventing rotation thereof;

(g) said fuel socket having a hinged socket valve spring-biased to close its other end; and (h) said air socket having a poppet valve spring-biased to close its other end, said valves being operable by said nipples when inserted into said sockets and being closable while said respective nipples are in their sockets when the nipples are moved axially into a position adjacent the other ends of said sockets.

4. Mechanism for connecting fuel and air conduits of a drop tank to an aircraft comprising:

(a) a fuel socket adapted to be secured at one end to an aircraft and adapted to discharge into the aircraft fuel system, (b) said fuel socket having one end of a fuel nipple slidably engaged in its other end;

(c) a first swivel connection between said fuel socket and said fuel nipple;

(d) an air socket secured to said fuel socket, adapted to be secured at one end to said aircraft and adapted to receive compressed air from an air supply in said aircraft, (e) said air socket having one end of an air nipple slidably engaged in its other end;

(f) a second swivel connection between said air socket and said air nipple;

(g) first locking means disposed between said fuel nipple and said first swivel connection, whereby said fuel nipple is rotatable when moved axially to a predetermined point so as to be removable from said fuel socket and being prevented from rotating when moved axially to a second predetermined point;

(h) an outer sleeve slidably engaged with and outwardly of each of said respective nipples and axially disposed inwardly of said bayonet means;

(i) spring means cooperating with said respective nipples and said respective outer sleeves so as to bias said outer sleeves toward said sockets and in abutment with an outer face of said respective sockets, said spring means holding said respective nipples in axially variable positions in said sockets; and (j) a third swivel connection between said outer sleeves of said fuel nipple and said air nipple spaced from said second swivel connection, whereby said two nipples may be tilted in unison and whereby each of said nipples may be rotated axially.

5. A coupling comprising:

(a) a socket;

(b) a nipple having an inner end slidably engaged in one of the ends of said socket;

(c) said socket having a first spring-biased hinged valve for closing its one end when said nipple is removed, said first valve being openable by said nipple in said socket, said valve being closable with said nipple in said socket when said nipple is moved axially into a variable position in said one end of said socket;

(d) the outer end of said nipple having pivoted thereto a second spring-biased valve for closing its outer end when said nipple is moved axially into said variable position;

(e) said second valve having secured thereto a cam arm; and (f) said outer sleeve having an adjustable shaft thereon engageable with said cam arm upon relative movement caused by said spring of said nipple toward the outer end of said outer sleeve to close said second valve and to hold it closed against a predetermined pressure differential tending to open said second valve.

6. A coupling comprising:

(a) a socket;

(b) a nipple having an inner end slidably engaged in one of the ends of said socket;

(c) an outer sleeve slidably engaged with and disposed outwardly of said nipple;

(d) a coiled spring in an annular space between said nipple and said outer sleeve so as to bias said outer sleeve toward said socket and in abutment with an outer face of said socket, said spring holding said nipple in axially variable positions in said socket;

(e) said socket having a first spring-biased hinged valve for closing its one end when said nipple is removed, said first valve being openable by said nipple in said socket, said valve being closable with said nipple in said socket when said nipple is moved axially into a variable position in said one end of said socket;

(f) the outer end of said nipple having pivoted thereto a second spring-biased valve for closing its outer end when said nipple is moved axially into said variable position;

(g) said second valve having secured thereto a cam arm; and (h) said outer sleeve having a member engageable with said cam arm upon relative movement caused by said spring of said outer sleeve toward the outer end of said nipple to close said second valve and to hold it closed against a predetermined pressure differential tending to open said second valve.

7. A coupling comprising:

(a) socket;

(b) a nipple having an inner end slidably engaged in one of the ends of said socket;

(c) an outer sleeve slidably engaged with and disposed outwardly of said nipple;

(d) a coiled spring in an annular space between said nipple and said outer sleeve so as to bias said outer sleeve toward said socket and in abutment with an outer face of said socket, said spring holding said nipple in axially variable positions in said socket;

(e) the outer end of said nipple having a spring-biased valve for closing its outer end when said nipple is moved axially into said variable position;

(f) said second valve having secured thereto a cam arm having a forked end; and (g) said outer sleeve having a pin engageable with said forked end of said cam arm upon relative movement caused by said spring of said nipple toward the outer end of said outer nipple to close said valve and to hold it closed against a predetermined pressure differential tending to open said valve.

8. For use in connecting to dual male fittings, a unitary dual coupling device comprising:

(a) a first socket having one end of a first nipple slidably engaged in one of its ends;

(b) a second socket having one end of a second nipple slidably engaged in one of its ends;

(a first swivel point provided between said first socket and said first nipple;

(d) a second swivel joint provided between said second socket and said second nipple;

(e) an outer sleeve slidably engaged with and outwardly disposed of each of said respective nipples;

(f) a third swivel joint provided between said outer sleeve of said first nipple and said second nipple spaced from said second swivel joint, whereby said nipples may be tilted in unison and each of said nipples may be rotated about its axis;

(g) spring means between each of said respective nipples and said respective outer sleeves so as to bias said outer sleeves toward said sockets and in abutment with an outer face of said respective sockets, said spring means holding said respective nipples in axially variable positions in said sockets;

(h) the outer end of said first nipple having a spring-biased valve for closing its outer end when said first nipple is moved axially into said variable position;

(i) said valve having secured thereto a cam arm; and (j) said outer sleeve of said first nipple having an adjustable shaft thereon engageable with said cam arm upon relative movement of said nipple toward the outer end of said outer sleeve to close said valve and to hold it closed against a predetermined adjustable pressure differential tending to open said valve.

References Cited by the Examiner

UNITED STATES PATENTS

| | | | |
|---|---|---|---|
| 932,146 | 8/09 | Lebold et al. | 251—341 X |
| 1,507,230 | 9/24 | Claflin | 285—376 X |
| 1,614,780 | 1/27 | Ehlers | 251—354 X |
| 1,818,508 | 8/31 | Scott | 251—339 X |
| 2,265,267 | 12/41 | Cowles | 285—402 X |
| 2,627,429 | 2/53 | Engleman | 285—376 X |
| 2,638,915 | 5/53 | Mitchell | 137—614.4 X |
| 2,853,265 | 9/58 | Clark | 251—341 X |
| 2,944,793 | 7/60 | Conrad | 251—341 X |

M. CARY NELSON, *Primary Examiner.*

UNITED STATES PATENT OFFICE
CERTIFICATE OF CORRECTION

Patent No. 3,177,896                                          April 13, 1965

James K. Mosher et al.

It is hereby certified that error appears in the above numbered patent requiring correction and that the said Letters Patent should read as corrected below.

Column 8, line 57, for "205" read -- 225 --; column 9, line 16, for "npple" read -- nipple --; column 11, line 39, for "mail" read -- male --; column 12, line 29, for "respecitve" read -- respective --; column 15, line 16, for "(a", in italics, read -- (c) --, in italics; same line 16, for "point" read -- joint --.

Signed and sealed this 15th day of March 1966.

(SEAL)
Attest:

ERNEST W. SWIDER                                    EDWARD J. BRENNER
Attesting Officer                                           Commissioner of Patents